Figure 1:
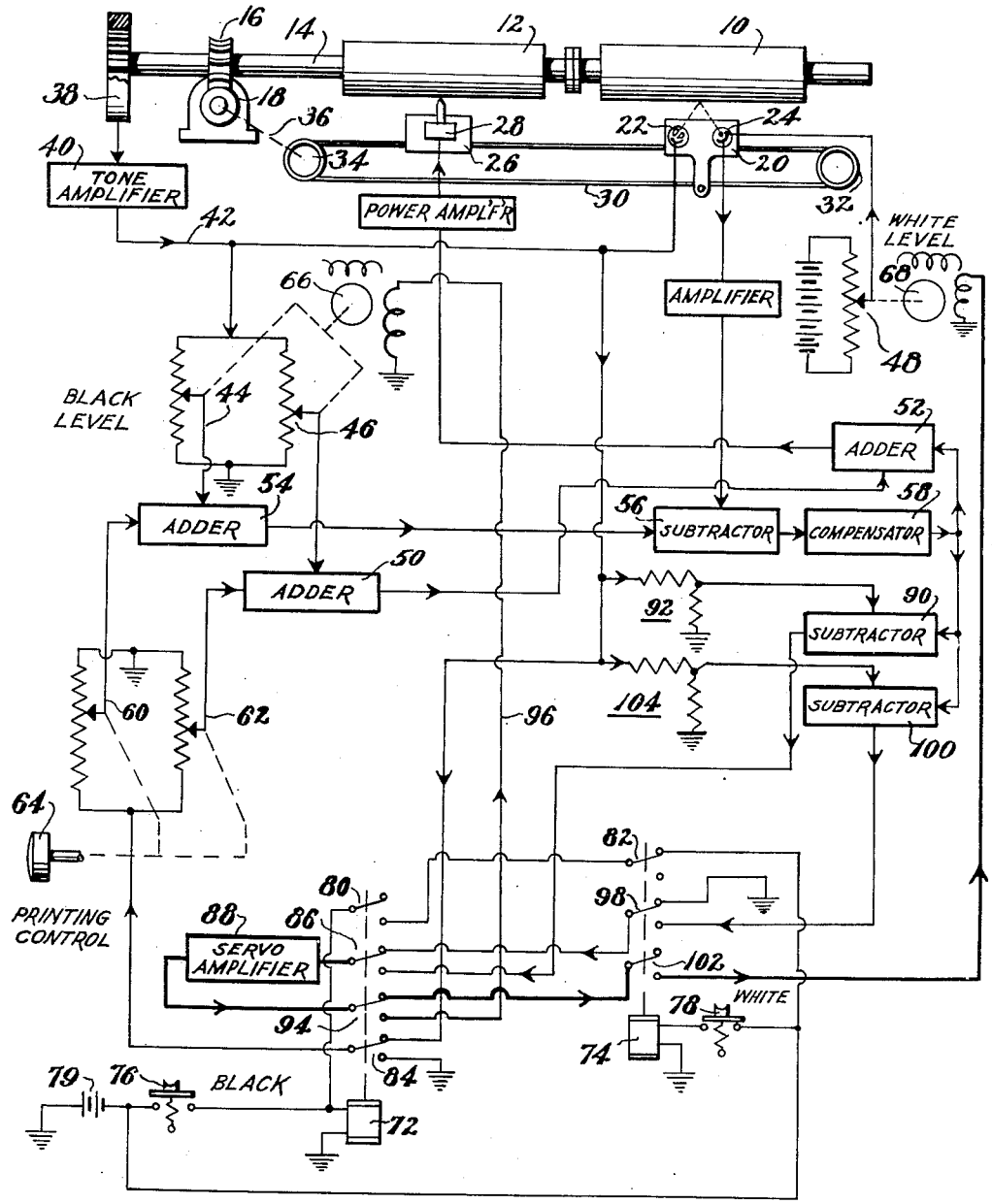

United States Patent Office 2,813,926
Patented Nov. 19, 1957

2,813,926

SEMI-AUTOMATIC CONTRAST CONTROL SYSTEM FOR PHOTOELECTRIC ENGRAVING MACHINES

Monroe Farber, Jericho, N. Y., assignor to Fairchild Camera and Instrument Corporation, a corporation of Delaware Application December 8, 1953, Serial No. 396,954

8 Claims. (Cl. 178—6.6)

This invention pertains to photoelectric engraving machines, and more particularly to a semi-automatic control system for regulating and adjusting the contrast or range of tonal values that will be produced in the engraved plate.

The invention constitutes an improvement upon photoelectric engraving machines for producing relief pattern plates of the type shown and described in Boyajean Patent No. 2,575,546, issued to the assignee of the present application, and more specifically, to improvements in such machines as modified in accordance with the copending applications of Monroe Farber, filed December 8, 1953, Ser. No. 396,952 and Ser. No. 396,953. The said copending applications deal with modifications of the basic machine of the patent to enable the operator to introduce into the machine characteristic a correcting factor by which allowance may be made for special aspects of the printing process in which the finished engraving is to be employed, and to provide corrections for short contrast scale originals. Thus, in addition to the usual adjustments to control the so-called black level and white level signal amplitudes of the engraving process, the first mentioned copending application provides circuits which may be deactivated during the making of the normal black and white signal level adjustments and which are thereafter activated to alter the final signal fed to the engraving stylus to set a minimum hole size which will be produced in the final engraving. These additional signals also automatically introduce compensation in the amplitude of the scanning photocell output signal so that the aforementioned correction does not seriously disturb the proper distribution of tones in the finished engraving, or produce other undesired effects.

While the apparatus of the copending applications greatly facilitates the making of the indicated corrections, the procedure which must be followed by the operator is relatively more intricate than in the case of simpler machines which do not provide the printing control adjustment. The present invention introduces a novel electromechanical system by which the settings of potentiometers (or equivalent adjustments) involved in the establishment of proper black and white signal levels is carried out by motors, and additionally provides for automatic circuit substitutions so that the proper circuits are activated and deactivated without further attention on the part of the operator. It is to be understood that the improvements of the present invention, however, can be applied to machines which do not incorporate the advantages of the copending cases, such as machines for use where the highest qualities of reproduction are not required, or for relatively coarse screen plates.

More specifically, it is an object of the invention to reduce the principal control adjustments to the operation of a pair of push-buttons or like switches controlling relays which not only produce the desired settings of the adjustments, but which also accomplish circuit changes essential to eliminate the effect of the printing control adjustment during the normal black and white setting procedure.

Figure 2:
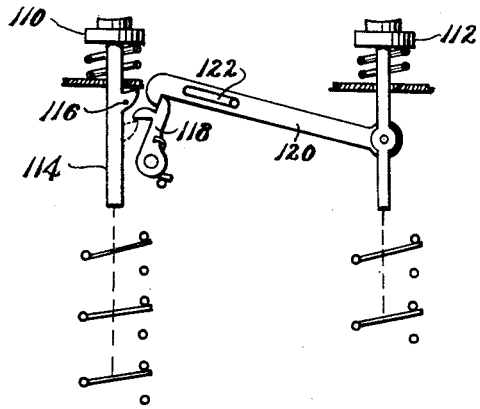
Figure 3:
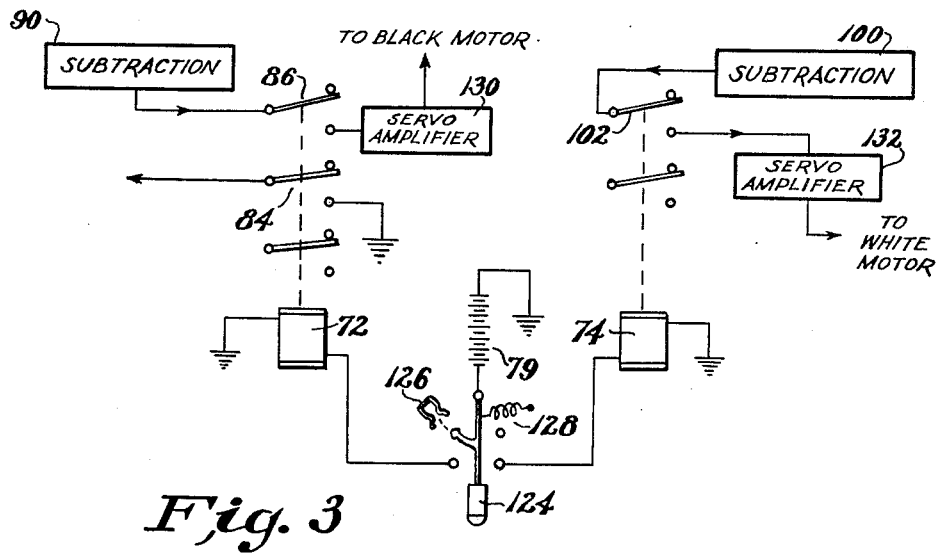

The above and other objects of the invention will best be understood by referring now to the following detailed specification of a preferred embodiment thereof, taken in connection with the appended drawings, in which:

Fig. 1 is a schematic diagram, partly in block form, illustrating the application of push-button controlled servo amplifier to the basic adjustments of a photoelectric engraving machine, Fig. 2 is a view of a portion of the structure of Fig. 1, with an alternative and purely mechanical interlock between the contact sets operated magnetically in Fig. 1, and Fig. 3 is a similar view illustrating the use of a simple toggle switch, without interlock, to control the relays of Fig. 1.

The invention will now be described in detail in one exemplary embodiment thereof in connection with the general type of engraving machine shown in the Boyajean patent. Reference is hereby made to said prior patent for additional details of the complete machine, since only the parts essential to an understanding of the present invention are reproduced herein.

Referring to Fig. 1 of the drawings, the engraving machine itself is shown diagrammatically as comprising the cylinders 10 and 12, mounted for synchronous rotation upon a common shaft 14 which may be driven as by reduction gearing 16 from a motor 18. One of the cylinders, such as cylinder 10, is arranged to have secured therearound an original, such as a photograph, of which an engraving is to be made. A carriage 20 is mounted to reciprocate along a path parallel to the axis of cylinder 10, as upon guides (not shown), and carries a suitable light source 22 directed upon a small spot of the original, from which the light is reflected to a photocell 24 also on carriage 20, so that the photocell output is a function of the reflectivity (or reflection density), of the successive regions of the original scanned by the device.

Cylinder 12 also has a carriage associated therewith, the same being designated 26, guided like cylinder 10 and carrying the magnetoelectric stylus motor and stylus indicated generally by 28. Cylinder 12 carries wrapped around it a plastic or like engraving sheet upon which the stylus cuts, burns, or otherwise forms an engraved image corresponding to the matter shown on the original copy sheet of cylinder 10. As more fully described in the prior patent referred to above, the carriages are connected to reciprocate alongside their respective cylinders in opposite directions as by being connected to opposite runs or passes of an endless flexible and inextensible belt-like connector 30 carried about opposite pulleys 32 and 34. One pulley is driven by suitable gearing, denoted by 36, from the same motor or gearing which rotates the cylinder shaft 14. Thus, the photocell system and the stylus system are reciprocated in timed relation to the cylinder rotation, and the illuminated spot and stylus trace out scanning helices upon the layers carried by their respective cylinders.

Since the final engraved plate must carry a representation equivalent to an ordinary screened printing plate for half-tone work, the apparatus includes means for generating a pattern signal governing the engraving motion of the stylus in a regular fashion, such signal being incorporated into the photocell output, as amplified and applied to the stylus motor. Such a generator is shown at 38 as driven synchronously from shaft 14, the details thereof being given in detail in the prior patent. The tone output, suitably amplified by a conventional amplifier 40, is applied to energize the gaseous illuminating lamp 22 over the path 42, and thus to modulate the photocell output voltage which also represents the variations in reflectivity of the original copy on cylinder 10, and the tone signal is also applied through other amplifiers and controls to the stylus motor 28.

The signal applied to the stylus motor is thus a composite signal made up of a component of fixed frequency and constant but adjustable amplitude, from the tone generator and intervening amplifiers and controls, and a component from the photocell and its output circuit which may be thought of as a slowly varying direct current derived from the variations in reflection density of the original copy, superimposed or modulated upon a carrier at tone generator frequency injected by reason of the energization of the exciting lamp 22 from the generator 38. In the patent mentioned above, these two components are referred to as the black level signal and the white level signal, respectively, so called because in making a normal engraved plate, adjustment of the black level signal will control the minimum penetration of the engraving stylus (that is, in the absence of any illumination from the copy to the photocell), while the white level signal will control the magnitude of the increase in penetration resulting from the scanning of an area of the original which is capable of reflecting any sensible amount of light into the cell.

The white level signal is adjusted by varying the magnitude, as by potentiometer 48, of the supply voltage applied to the photocell 24 from any suitable source shown for simplicity as a battery. The black level signal is obtained principally from the potentiometer 46 supplied from tone amplifier 40, the adjusted signal level passing through an adding circuit 50 to another adding circuit 52 which feeds the power amplifier and thence the stylus motor 28. Another fraction of the signal from the tone amplifier 40 is selected by potentiometer 44 and passes through adding circuit 54 to a subtracting circuit 56 which subtracts this fraction from the amplified photocell output and feeds the composite signal through compensating circuit 58 to the adding circuit 52. Thus, there is obtained a final output which is a composite of a black level signal whose magnitude is established by potentiometer 46, and the output of photocell 24, the latter having subtracted therefrom a signal determined by potentiometer 44. The other input to each of the adding circuits 50 and 54 is obtained, as explained in the copending application Serial No. 396,952 referred to above, from respective ganged potentiometers 60 and 62 controlled by a printing control knob 64 to modify the signal applied to the stylus motor in accordance with the characteristics of a particular printing process (paper, inks and the like) in which the engraved plate is to be utilized. In that copending application, a switch was provided for disabling the outputs of potentiometers corresponding to 60 and 62, so that the normal black and white level adjustments (which depend upon the characteristics of the original subject matter) could be made without any influence of the setting of printing control knob 64. This disabling function is performed automatically by the present invention, by means to be described below.

Instead of manual control knobs or the like for adjusting the ganged potentiometers 44 and 46 and the white level voltage control 48, the present invention connects the shafts of these potentiometers to control motors 66 and 68 respectively, and the operation of said motors is governed by respective relays 72 and 74, which may be energized by the operation of momentary switches or push-buttons 76 and 78 respectively. As shown in Fig. 1, a suitable relay-energizing voltage source 79 can be applied to the coil of relay 72 by depressing the "black" control button 76 completing a hold circuit via normally open contacts 80 of relay 72 to normally closed contacts 82 of relay 74, this holding circuit maintaining relay 72 in its operated condition after button 76 is released.

With relay 72 operated, its contacts 84 place a ground across potentiometers 60 and 62 and thus disable the printing control signal modifications which would otherwise be applied to adding circuits 50 and 54. At the same time, contacts 86 of relay 72 apply to the servo amplifier 88 a signal obtained from a subtractor circuit 90 which is the difference between the compensated output from compensating circuit 58 and a predetermined fraction of the amplified tone generator output at channel 42. This fraction of the tone generator output is established by a voltage divider 92 supplied from tone amplifier 40 to a resistance network constituting the voltage divider and thence to subtracting circuit 90. Also, with relay 72 operated, its contacts 94 apply the output of servo amplifier 88 to black level motor 66 via a conductor 96, and the motor proceeds to operate the ganged potentiometers 44 and 46 until such time as the output of subtracting circuit 90 becomes zero; that is, until there is no difference between the signal applied to the stylus motor amplifier and the selected fraction of the screen tone determined by divider 92. The operator may then adjust the stylus motor 28 with respect to cylinder 12 to produce the proper black level penetration in the way described in the Boyajean patent.

To make the white level adjustment, the operator may then depress push-button 78, which will energize relay 74 and in so doing will open its contacts 82 to release relay 72 and restore it to its Fig. 1 condition. Thereupon, a circuit is completed via contacts 98 of relay 74 from a subtracting circuit 100 to contacts 86 of relay 72 and to servo amplifier 88, whose output will pass over contacts 94 of relay 72 and contacts 102 of relay 74 to motor 68, which will adjust potentiometer 48 to vary progressively the supply voltage applied to photocell 24.

The output of subtracting circuit 100 is the difference between the compensated output of circuit 58 and another predetermined fraction of the screen voltage, which fraction is set by a voltage divider 104. When this difference becomes zero, motor 68 will come to a stop and push-button 78 can be released by the operator.

One reason peculiar to apparatus of this type which makes the semi-automatic control system desirable is that the operator needs to make an adjustment of the stylus, relative to the engraving sheet, during the setting of the black level, and must also view the result of the trial engraving (on the sheet's edge) through a microscope which is equipped with a stroboscopic light source. Operation of the controls, including the microscope illumination control, becomes difficult for this reason. In general, the sequence of operations in adjusting the machine is as follows:

(1) Adjust printing control 64 to a known setting appropriate to the process in which the engraved plate will be used.

(2) Start machine, disconnect clutches to free cylinder 10 and carriage 20 from their drives, place the scanning spot on a blackest portion of the original.

(3) Press "black" button 76 and after releasing, adjust stylus position relative to engraving sheet, while observing craters or holes cut in a trial or edge portion of the plate.

(4) Press "white" button 78, and hold it down while the scanned spot is held upon a "whitest" portion of the original.

(5) Release "white" button, move both carriages to starting position, and engage clutches to drive cylinder 10 and carriage 20.

If desired, suitable signals, such as lamps or the like, may be incorporated to advise the operator when each motor has come to a stop, to avoid improper operation of the controls.

The relays 72 and 74 of Fig. 1 are electrically interlocked, as already described, to hold relay 72 operated after even a momentary depression of button 76, until such time as the white button 78 is pressed. A mechanical interlock for this purpose is shown schematically in Fig. 2 of the drawings, parts unnecessary for an understanding thereof being omitted.

In Fig. 2, the contact sets of relays 72 and 74 are duplicated, as in Fig. 1, except that the interlock contacts are omitted, as are the operating magnets of such relays. Instead, each contact set is operated by a mechanical push button, numbered 110 and 112 respectively. Each button is held away from the control panel by a spring which urges it normally into raised position. "Black" button 110 engages the contacts through a rod 114 carrying a latch portion 116 which, when the button is depressed to operate the contacts, is held by a spring-pressed detent 118, as shown in dotted lines. When the "white" button 112 is pressed, a link 120 pivoted thereon and guided by a pin in slot 122 of such link, retracts the detent 118 and frees the black button to return to its normal position. In other respects, the mechanism described operates the same as that of Fig. 1.

Fig. 3 of the drawings shows a further modification of the interlock arrangement, in which relays 72 and 74 are again employed, but instead of interlock contacts on such relays, a toggle switch 124 selectively connects the voltage source 79 to the appropriate relay. Thus, when the switch handle is moved to the left, or "black" adjusting position, it is mechanically held against return as by a spring clip 126 engaging a protuberance on the switch shaft. Upon completion of the black adjustment, the handle is manually moved to the right, energizing relay 74 and deenergizing relay 72. Upon its further release, the handle is returned to its center position by a spring 128. The other parts shown in Fig. 3 have the same functions as described in connection with Fig. 1, except that a pair of separate servo amplifiers is utilized.

The arrangement of Fig. 1 permits a single servo amplifier to have both its input and its output switched in order to make a single amplifier operate both black and white adjustments. The saving in amplifier cost is valuable, but the switching problem is relatively more complicated. In Fig. 3, which eliminates both the servo amplifier switching contacts and the electrical hold circuit contacts, the relays can be extremely simple and cheap. Thus, as shown, subtraction circuit 90 is merely connected through relay contact 86 to a first amplifier 130, and subtraction circuit 100 is connected to a second amplifier 132, the amplifiers being connected to the respective drive motors of Fig. 1. If it is desired not to operate the amplifiers at all times, they can readily be disabled by removing the supply voltages for their amplifying tubes or other circuits, or the respective motors may be de-energized by any convenient manual switch.

It will be seen that I have accomplished the novel objects of the invention in relatively simple and inexpensive ways, but it is to be understood that the apparatus may be modified without departing from the spirit of my invention as defined in the appended claims.

I claim:

1. In an engraving machine of the type including means for scanning original copy and deriving signals therefrom, means for controlling a plate engraving tool in accordance with such signals, a tone source connected to modulate said signals at a fixed frequency, and a separate first and second control means for adjusting respectively the depth of cut of said tool when a black portion of the copy is scanned and the amplitude of said derived signals when a white portion is scanned, the improvement comprising first servo-motor means for operating said first control means in accordance with the difference between the amplitude of said signals and a predetermined fraction of the output of said tone source, other servo-motor means for operating said second control means in accordance with the difference between the amplitude of said signals and another predetermined fraction of the output of said tone source, interlock means actuated concomitantly with said first servo-motor means for maintaining the same energized, and means responsive to operation of said other servo-motor means for disabling said interlock means and thereby said first servo-motor means.

2. Apparatus in accordance with claim 1, in which said interlock means comprises a pair of relays connected to control said respective servo-motor means, and an energizing circuit for one of said relays connected in series with normally closed contacts of the other relay.

3. Apparatus in accordance with claim 1, in which said interlock means comprises a pair of pushbuttons for energizing said respective servo-motor means, an element for latching one of said pushbuttons in operated condition, and means controlled by the other push-button for releasing said latching element.

4. Apparatus in accordance with claim 1, in which said interlock means comprises a pair of relays controlling said servo-motors, and a plural-position switch for energizing said relays in sequence.

5. Apparatus in accordance with claim 4, including means for restraining said switch in one position in which one relay is operated until said switch is manually moved to operate the other of said relays.

6. A control system for a photoelectric engraving machine of the type having means for scanning original copy, means for engraving the surface of a sheet in accordance with the scan signals derived from the scanning means, a source of fixed frequency alternating tone signals connected to modulate the scan signals and thereby to operate said engraving means to produce a pattern of variable-size dots on said sheets in a regular recurrence pattern, and a pair of adjustable control devices for separately adjusting the relative magnitudes of the scan signals and the tone signals applied to said engraving means, the improvement which comprises means for deriving directly from said tone source reference voltage values corresponding respectively to desired values of the scan signal magnitude and the tone signal magnitude to be applied to said engraving means, first and second comparing means for individually comparing the said reference voltage values with the respective signals applied to said engraving means, a motor connected to each of said control devices for adjusting the same, and means responsive to the output of said respective comparing means for individually controlling said motors to adjust said control devices so as to bring the magnitudes of the scan and tone signals applied to the engraving means to the values established by said reference voltage values.

7. A control system in accordance with claim 6, in which said means responsive to the output of said comparing means comprises a single control amplifier, and switching means for selectively connecting the input of said control amplifier to one of said comparing means, and for simultaneously connecting the output of said amplifier to a corresponding one of said motors.

8. A control system in accordance with claim 7 including printing control means for modifying the effect of said tone signal source on said engraving means, and means controlled by said switching means for selectively disabling said printing control means during the time said amplifier is connected to one of said motors.

No references cited.